(12) United States Patent
Han et al.

(10) Patent No.: US 7,009,675 B2
(45) Date of Patent: Mar. 7, 2006

(54) MOTHER SUBSTRATE FOR LIQUID CRYSTAL DISPLAY APPARATUS AND METHOD OF MANUFACTURING SAME

(75) Inventors: Hye-Rhee Han, Uiwang-si (KR); Yun Jang, Yongin-si (KR); Kyeong-Hyeon Kim, Yongin-si (KR); Kye-Hun Lee, Suwon-si (KR)

(73) Assignee: Samsung Electronics Co., Ltd., (KR)

( * ) Notice: Subject to any disclaimer, the term of this patent is extended or adjusted under 35 U.S.C. 154(b) by 70 days.

(21) Appl. No.: 10/802,207

(22) Filed: Mar. 17, 2004

(65) Prior Publication Data

US 2004/0263765 A1 Dec. 30, 2004

(30) Foreign Application Priority Data

Jun. 28, 2003 (KR) ............ 10-2003-0042949

(51) Int. Cl.
*G02F 1/1339* (2006.01)
(52) U.S. Cl. ............ 349/153; 349/155; 349/156; 349/190

(58) Field of Classification Search ............... 349/153, 349/155, 156, 190
See application file for complete search history.

(56) References Cited

U.S. PATENT DOCUMENTS

| | | | |
|---|---|---|---|
| 6,705,584 B1 * | 3/2004 | Hiroshima et al. | 349/156 |
| 6,724,458 B1 * | 4/2004 | Kim et al. | 349/156 |
| 2003/0025868 A1 * | 2/2003 | Hiroshima et al. | 349/156 |
| 2004/0160568 A1 * | 8/2004 | Kim et al. | 349/156 |

* cited by examiner

*Primary Examiner*—James A. Dudek
(74) *Attorney, Agent, or Firm*—F. Chau & Associates LLC

(57) ABSTRACT

A liquid crystal display substrate, comprising a first substrate including at least one substantial region, a dummy region adjacent the at least one substantial region, a plurality of first spacers and a first sealant positioned in the at least one substantial region, and a plurality of second spacers and a second sealant positioned in the dummy region, wherein each of the plurality of second spacers are spaced apart from one another at a uniform distance, and the second sealant is capable of being positioned in at least one open area created by spacing the second spacers apart from one another.

46 Claims, 7 Drawing Sheets

MOTHER SUBSTRATE FOR LIQUID CRYSTAL DISPLAY APPARATUS AND METHOD OF MANUFACTURING SAME

The present application claims priority from Korean Patent Application No. 2003-42949, filed on Jun. 28, 2003, the disclosure of which is hereby incorporated herein by reference in its entirety.

BACKGROUND OF THE INVENTION

1. Technical Field

The present disclosure relates to a mother substrate for a liquid crystal display (LCD) apparatus and a method of manufacturing same.

2. Discussion of the Related Art

In an LCD apparatus, liquid crystal may be disposed between a thin film transistor (TFT) substrate and a color filter substrate. The color filter substrate may be manufactured using different processes from those of the TFT substrate.

The liquid crystal can be subject to an electric field formed between the color filter substrate and the TFT substrate. Upon application of the electric field, the liquid crystal molecules change their orientation and light passing through the liquid crystal is polarized. Appropriately positioned filters may filter the polarized light, creating areas that represent desired images.

The TFT substrate is spaced apart from the color filter substrate by a distance referred to as a cell gap so as to receive the liquid crystal therebetween. The cell gap can depend on intrinsic characteristics of the liquid crystal and may be several micrometers. For example, for a twisted nematic (TN) mode liquid crystal display apparatus, the cell gap may be about 4.6 $\mu$m.

In order to maintain the cell gap, spacers and sealants may be formed between the TFT substrate and the color filter substrate. For example, a spacer and a sealant may be formed on each cell of a color filter mother substrate or a TFT mother substrate.

When the spacers and sealants are formed only on the cells of the color filter or TFT mother substrates, the TFT substrate and the color filter substrate may not have a uniform cell gap.

In order to maintain uniformity of the cell gap, spacers and sealants may also be formed in dummy regions of the TFT or color filter substrates. A dummy region is a region between the cells of the color filter mother substrate or a region between the cells of the TFT mother substrate. The dummy region may be defined by cutting lines.

The location of a sealant(s) may be changed during the manufacturing process of an LCD so as to optimize the uniformity of the cell gap. However, when the location of a sealant is changed, the locations of the spacers are also changed, whereby a pattern of the spacers is determined in accordance with a pattern of the sealant. As a result, a new mask for the spacers as well as a new mask for the sealant is required. Therefore, manufacturing cost is increased, while productivity is decreased.

SUMMARY OF THE INVENTION

A liquid crystal display substrate, in accordance with an embodiment of the present invention, comprises a first substrate including at least one substantial region, a dummy region adjacent the at least one substantial region, a plurality of first spacers and a first sealant positioned in the at least one substantial region, and a plurality of second spacers and a second sealant positioned in the dummy region, wherein each of the plurality of second spacers are spaced apart from one another at a uniform distance, and the second sealant is capable of being positioned in at least one open area created by spacing the second spacers apart from one another.

The uniform distance may be greater than a width of the second sealant and may range from about 1.5 mm to about 2.5 mm. Each of the plurality of second spacers may have a uniform size, wherein each of the plurality of second spacers includes a cubic shape with a side length in the range of about 50 $\mu$m to about 150 $\mu$m. Each of the plurality of second spacers may include one of a cubic shape, a cylindrical shape and a prism shape. The second sealant may be positioned substantially parallel to the first sealant.

The liquid crystal display substrate may further comprise a second substrate positioned opposite the first substrate, and a liquid crystal layer between the first substrate and the second substrate. The first sealant and the second sealant may be positioned between the first substrate and the second substrate to bind the first substrate and the second substrate and create a gap therebetween. The first substrate may be a color filter substrate and the second substrate may be a thin-film transistor substrate.

The first sealant may be positioned on a seal line portion of the at least one substantial region. A cutting line may be positioned between the at least one substantial region and the dummy region, wherein the cutting line defines the at least one substantial region. The first sealant and the second sealant may include one of an ultraviolet curable sealant and a thermally curable sealant. The plurality of first spacers and the plurality of second spacers may be formed from one of a photoresistive insulating layer and a light-insensitive insulating layer. The second sealant may be positioned in at least one other open area created by spacing the second spacers apart from one another at the uniform distance, A liquid crystal display substrate, in accordance with another embodiment of the present invention, comprises a first substrate including at least one substantial region, a dummy region adjacent the at least one substantial region, a plurality of first spacers and a first sealant positioned in the at least one substantial region, a plurality of second spacers and a second sealant positioned in the dummy region, wherein each of the plurality of second spacers are spaced apart from one another at a uniform distance, and the second sealant is capable of being positioned in at least one open area created by spacing the second spacers apart from one another, and a second substrate positioned opposite the first substrate including at least one corresponding substantial region.

The first sealant and the second sealant may be positioned between the first substrate and the second substrate to bind the first substrate and the second substrate and create a gap therebetween. The gap may include liquid crystal. The at least one substantial region of the first substrate and the at least one corresponding substantial region of the second substrate may be combined to define an area including a liquid crystal display panel. A plurality of color filters may be formed on the at least one substantial region of the first substrate, and a plurality of thin-film transistors may be formed on the at least one corresponding substantial region of the second substrate.

A method for forming a liquid crystal display substrate, in accordance with an embodiment of the present invention, comprises forming a plurality of first spacers and a first sealant in at least one substantial region on a first substrate, forming a plurality of second spacers and a second sealant in a dummy region on the first substrate adjacent the at least one substantial region, wherein each of the plurality of second spacers are spaced apart from one another at a uniform distance, and positioning the second sealant in at least one open area created by spacing the second spacers apart from one another.

The method may further comprise positioning the second sealant substantially parallel to the first sealant, dropping liquid crystal in the at least one substantial region, positioning a second substrate opposite the first substrate, and injecting liquid crystal between the first substrate and the second substrate. The liquid crystal may be injected through a hole formed in the first sealant. The method may also include positioning the first sealant and the second sealant between the first substrate and the second substrate to bind the first substrate and the second substrate and create a gap therebetween. The method may further comprise forming a plurality of color filters on the first substrate, forming a plurality of thin-film transistors on the second substrate, positioning the first sealant on a seal line portion of the at least one substantial region, and forming a cutting line between the at least one substantial region and the dummy region, wherein the cutting line defines the at least one substantial region.

The method may also comprise positioning the second sealant in at least one other open area created by spacing the second spacers apart from one another at the uniform distance, and curing the first sealant and the second sealant by exposing the first sealant and the second sealant to one of heat and ultraviolet light.

Forming the plurality of first spacers may includes forming a photoresistive insulating layer in the at least one substantial region, exposing the photoresistive insulating layer to ultraviolet light using a photomask having a pattern corresponding to the plurality of first spacers to form a patterned insulating layer, and developing the patterned insulating layer to form the plurality of first spacers. Forming the plurality of first spacers may also include forming a light-insensitive insulating layer in the at least one substantial region, coating the light-insensitive insulating layer with a photoresist layer, forming a photoresist pattern, and etching the light-insensitive insulating layer using the photoresist pattern as an etching mask to form the plurality of first spacers.

BRIEF DESCRIPTION OF THE DRAWINGS

Preferred embodiments of the present invention can be understood in more detail from the following descriptions taken in conjunction with the accompanying drawings, in which.

DETAILED DESCRIPTION OF THE PREFERRED EMBODIMENTS

Preferred embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
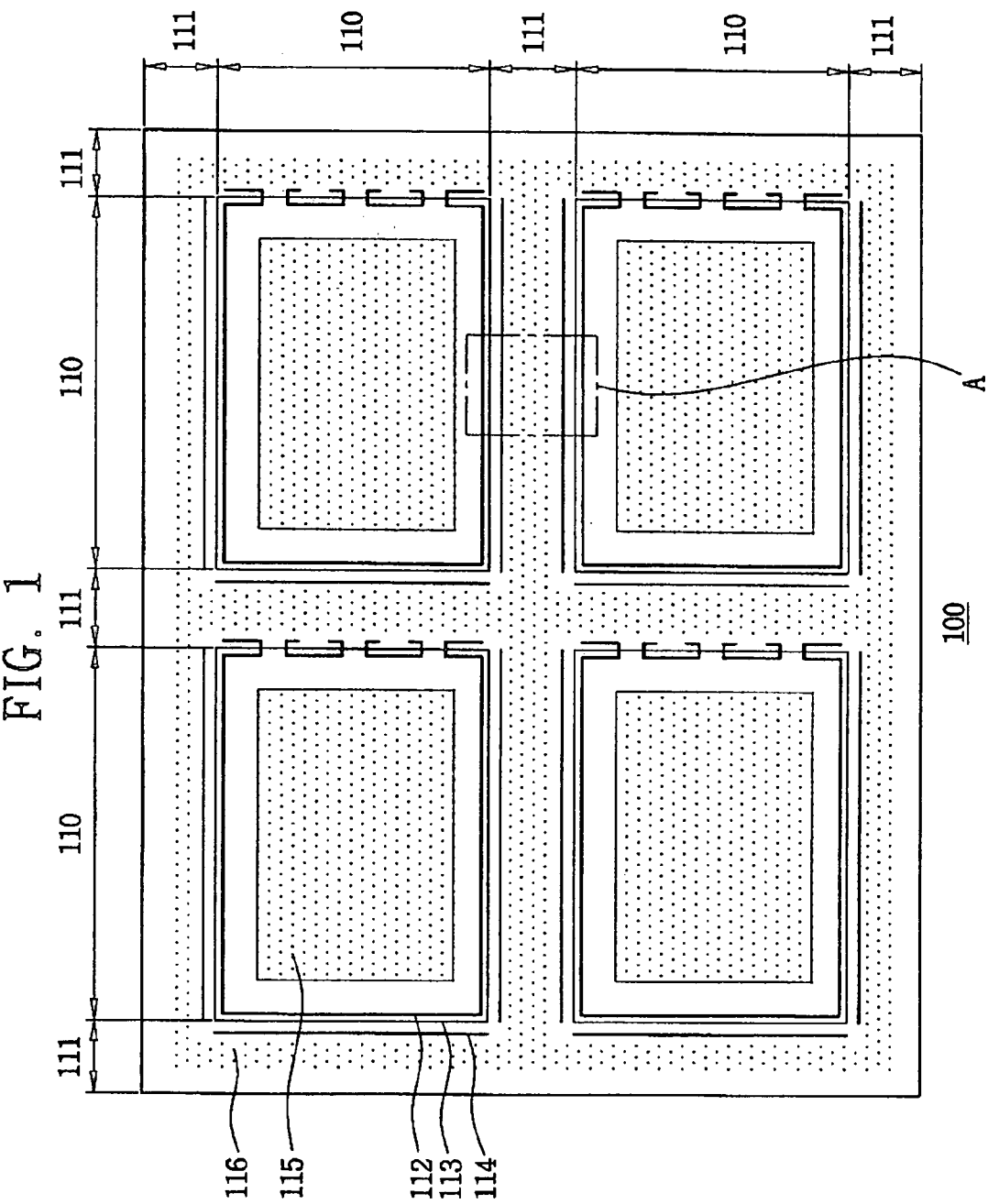
FIG. 1 is a plan view showing a color filter mother substrate for an LCD apparatus according to an embodiment of the present invention.

FIG. 1 is a plan view showing a color filter mother substrate for an LCD apparatus according to an embodiment of the present invention.

Referring to FIG. 1, a color filter mother substrate 100 includes a plurality of substantial regions 110 appropriately sized to form a plurality of LCD panels when combined with the TFT mother substrate 200 and a dummy region 111 outside of the substantial regions 110. A plurality of color filter cells is formed on each of the substantial regions 110. The color filter mother substrate 100 may include one substantial region 110 in the case of a large-scaled panel. Each of the substantial regions 110 includes a seal line portion, and borders of each of the substantial regions 110 are defined by the cutting line 113. The cutting line 113 is disposed between a substantial region 110 and the dummy region 111. A first sealant 112 is disposed on the seal line portion. The seal line portion is disposed in a peripheral portion (not shown) of the substantial region 110, and the seal line portion is substantially parallel with the cutting line 113. The dummy region 111 is disposed between cutting lines 113 of adjacent substantial regions 110. That is, the dummy region 111 is disposed between the substantial regions 110.

The LCD panels are formed by combining the color filter substrate 100 with the TFT substrate 200 (FIGS. 3A–3D). Color filter cells formed on the color filter substrate 100 are combined with TFT cells formed on the TFT substrate 200 to form liquid crystal cells. Each LCD panel, including a plurality of liquid crystal cells, is separated from the mother substrates 100, 200 by cutting along the cutting lines 113.

The TFT substrate 200 includes a plurality of TFTs formed thereon and arranged in a matrix shape using deposition and etching processes. Each TFT includes a source, gate and drain electrode. The source electrode is connected to a data line, and the data line may be extended in a column direction of the TFT substrate. The gate electrode is connected to a gate line, and the gate line may be extended in a row direction of the TFT substrate.

Black matrices (not shown), common electrodes (not shown), and red (R), green (G) and blue (B) color filters (not shown) are formed on portions of the TFT mother substrate 200 corresponding to each substantial region 110. Each common electrode includes a transparent conductive material such as indium tin oxide (ITO), indium zinc oxide (IZO), etc. Each common electrode may be formed on the R, G and B color filters, or may be formed under the R, G and B color filters. Each substantial region 110 includes a display portion (not shown) and a peripheral portion (not shown). R, G and B color filters are also formed on the display portion of each substantial region 110 of the color filter mother substrate 100, and pixel electrodes (not shown) are formed on portions of the TFT mother substrate 200 corresponding to the display portions of the color filter mother substrate 100. The black matrix and the first sealant 112 are formed on the seal line portion of the peripheral portion of each substantial region 110 of the color filter mother substrate 100. The gate and data lines are formed on portions of the TFT mother substrate 200 corresponding to the peripheral portions of the color filter mother substrate 100.

Light transmittance of liquid crystal disposed on the display portion is controllable so as to display an image. Light transmittance of liquid crystal disposed on the peripheral portion is not controllable. As a result, light that passes through the peripheral portion is masked. The black matrix, formed on the seal line portion of the peripheral portion of each substantial region 110 of the color filter mother substrate 100, can mask light passing through the peripheral portion.

When a driving signal and a timing signal are supplied to a TFT through the data and gate lines of the LCD panel, the TFT is turned-on to form an electric field between the pixel and common electrodes. When the electric field is formed between the pixel and common electrodes, a liquid crystal layer disposed between the color filter substrate and the TFT substrate changes its orientation in response to the electric field applied thereto, and thus light transmittance through the liquid crystal layer may be changed, thereby resulting in the display of an image.

As shown in FIG. 1, the color filter mother substrate 100 includes a first sealant 112 and a plurality of first spacers 115 formed in each substantial region 110. The first sealant 112 is formed on the seal line portion of each substantial region 110. The color filter mother substrate 100 also includes a plurality of second spacers 116 and a second sealant 114 formed in the dummy region 111 surrounding each substantial region 110. Each second sealant 114 is disposed substantially parallel to each corresponding first sealant 112.

The second spacers 116 preferably have a uniform size and are spaced apart from each other at a uniform distance. A location of the second sealant 114 for each substantial region 110 may be in one of the open areas created by spacing the second spacers 116 apart from each other. That is, a second sealant 114 may be freely positioned in more than one open area formed between the second spacers 116. Accordingly, to allow the second sealant 114 to fit in the open space between the second spacers 116, the second spacers 116 are spaced apart from one another at a uniform distance which is greater than the width of the second sealant 114.

As a result, when location of the second sealant 114 is changed, locations of the second spacers 116 are not changed., thereby omitting the need for a new mask to create the second spacers 116. Thus, the number of masks for forming the second spacers 116 and the second sealant 114 after changing the location of the second sealant 114 is decreased, manufacturing cost is decreased, and productivity of the LCD apparatus is increased.

Figure 2:
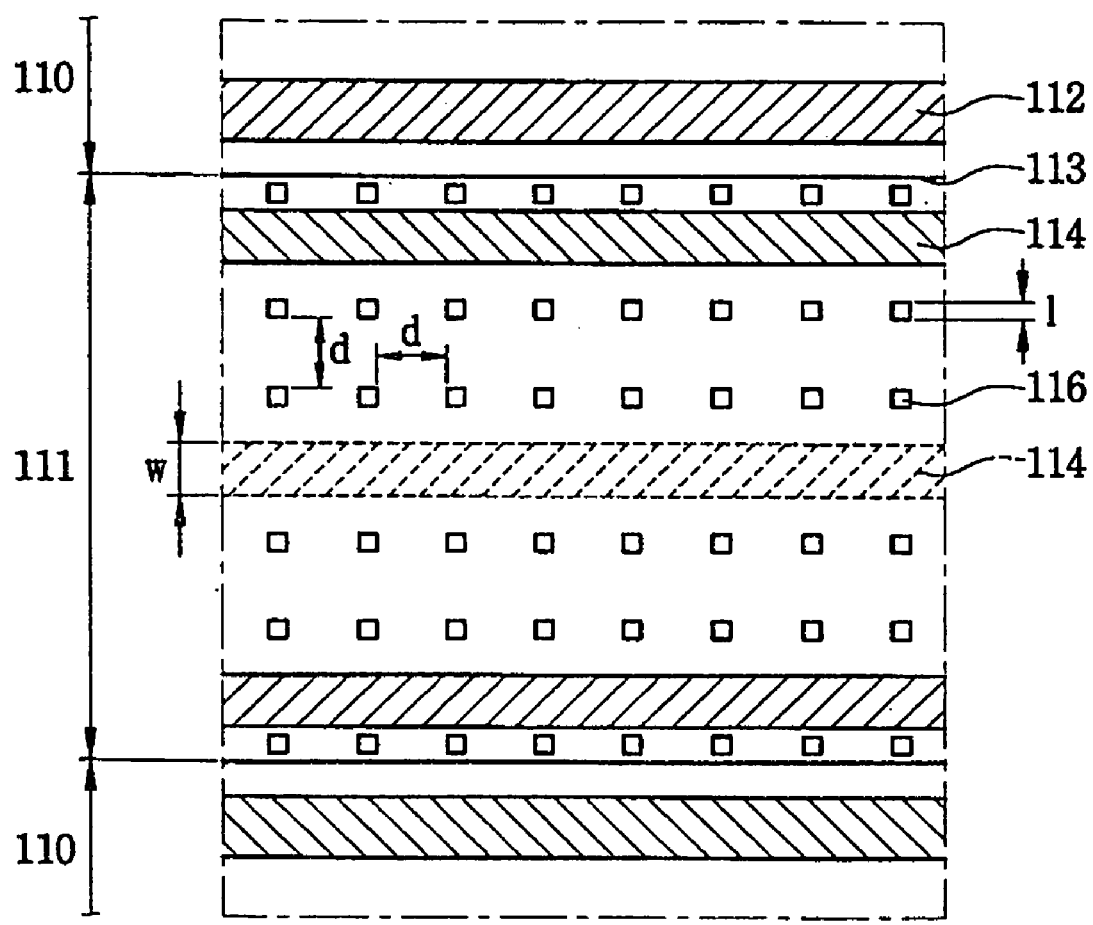
FIG. 2 is a cross-sectional view showing a portion 'A' of FIG. 1.

Referring to FIG. 2, which is a cross-sectional view showing a portion 'A' of FIG. 1, the first sealant 112 is formed on a seal line portion of the substantial region 110, and the cutting line 113 is disposed between the substantial and dummy regions 110 and 111.

The second sealant 114 and the second spacers 116 are disposed in the dummy region 111. A distance (d) between the second spacers 116 is wider than a width (W) of the second sealant 114. Preferably, each of the second spacers 116 includes a cubic shape having a side length (l) from about 50 $\mu$m to about 150 $\mu$m, and a distance (d) between the second spacers 116 from about 1.5 mm to about 2.5 mm. The second spacers 116 also may have a cylindrical shape or a polygonal prism shape.

When the second spacers 116 having uniform size are spaced apart from each other at a uniform distance, which is wider than the width of the second sealant 114, the second sealant 114 is disposed between the second spacers 116. Therefore, the location of the second sealants 114 may be changed while the locations of the second spacers 116 remain the same.

Figure 3A:
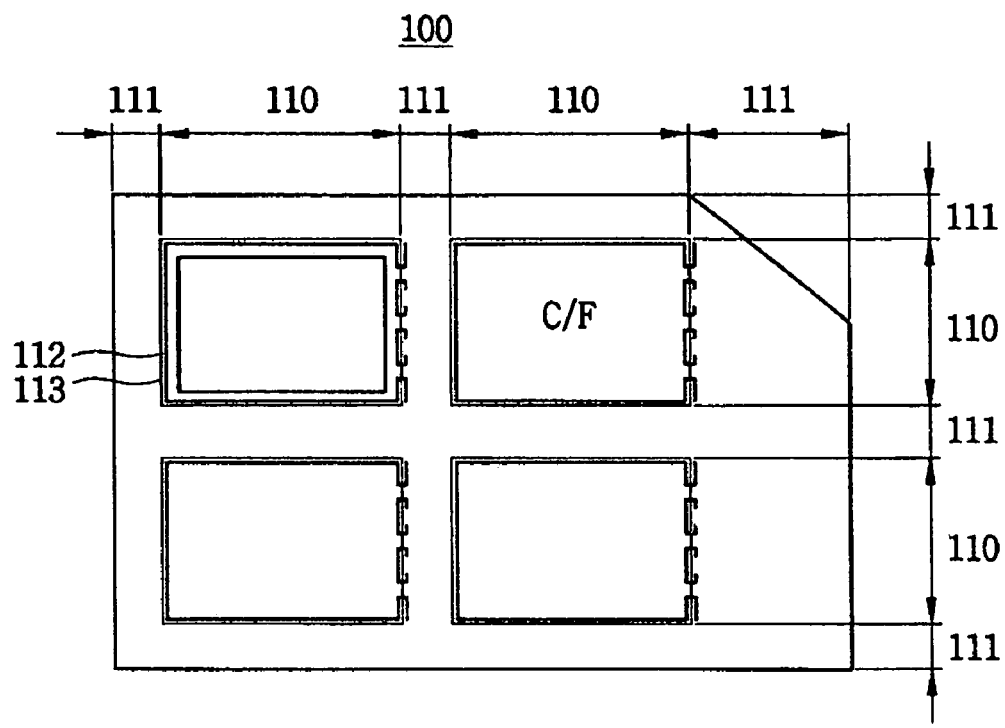
FIGS. 3A to 3E are plan views for illustrating a method of manufacturing a mother substrate for an LCD apparatus according to an embodiment of the present invention.
Figure 3A:
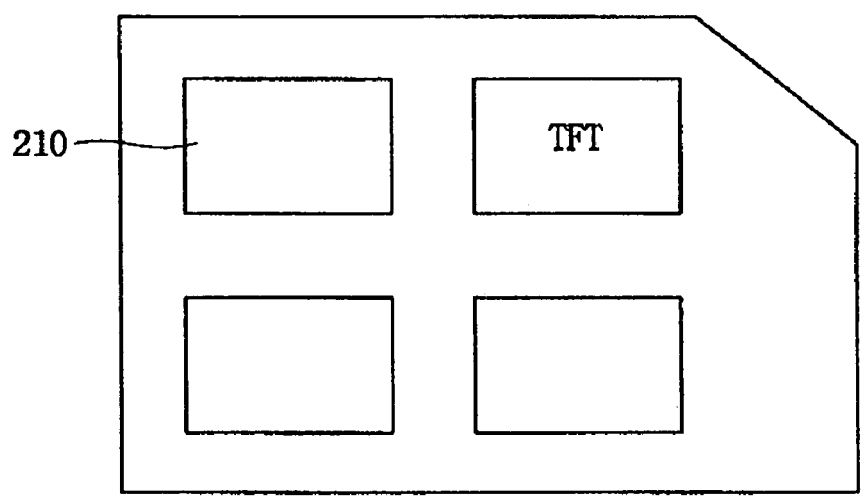
Figure 3B:
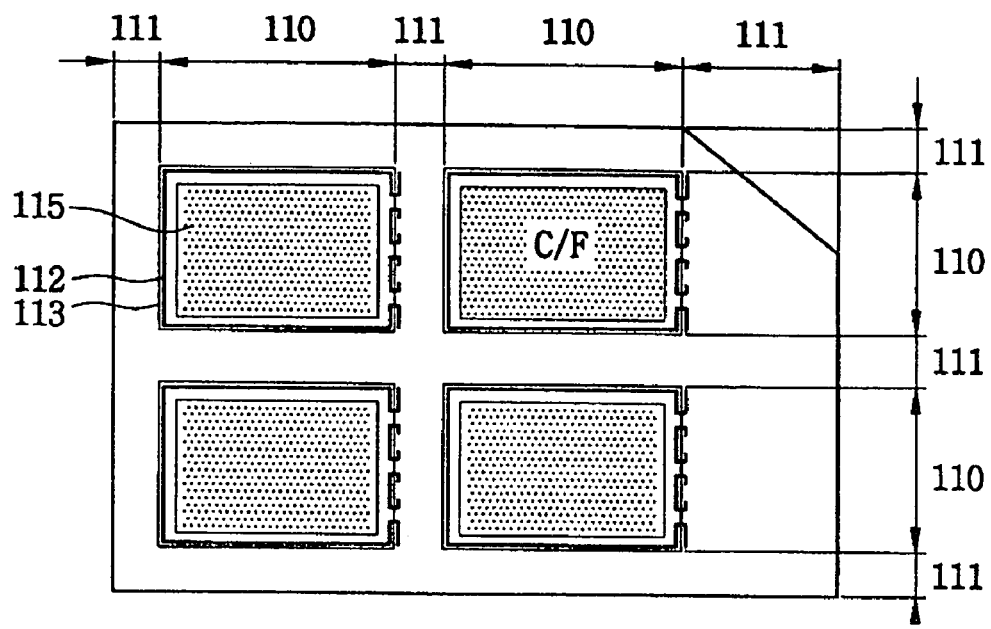
Figure 3B:
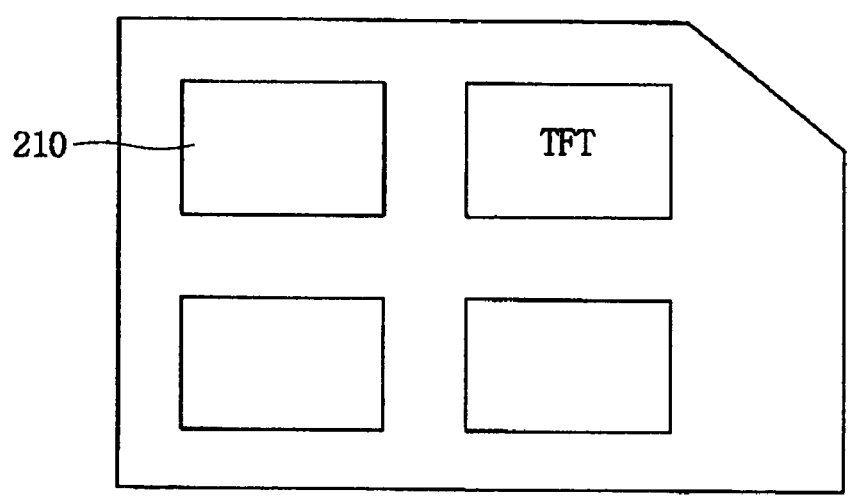
Figure 3C:
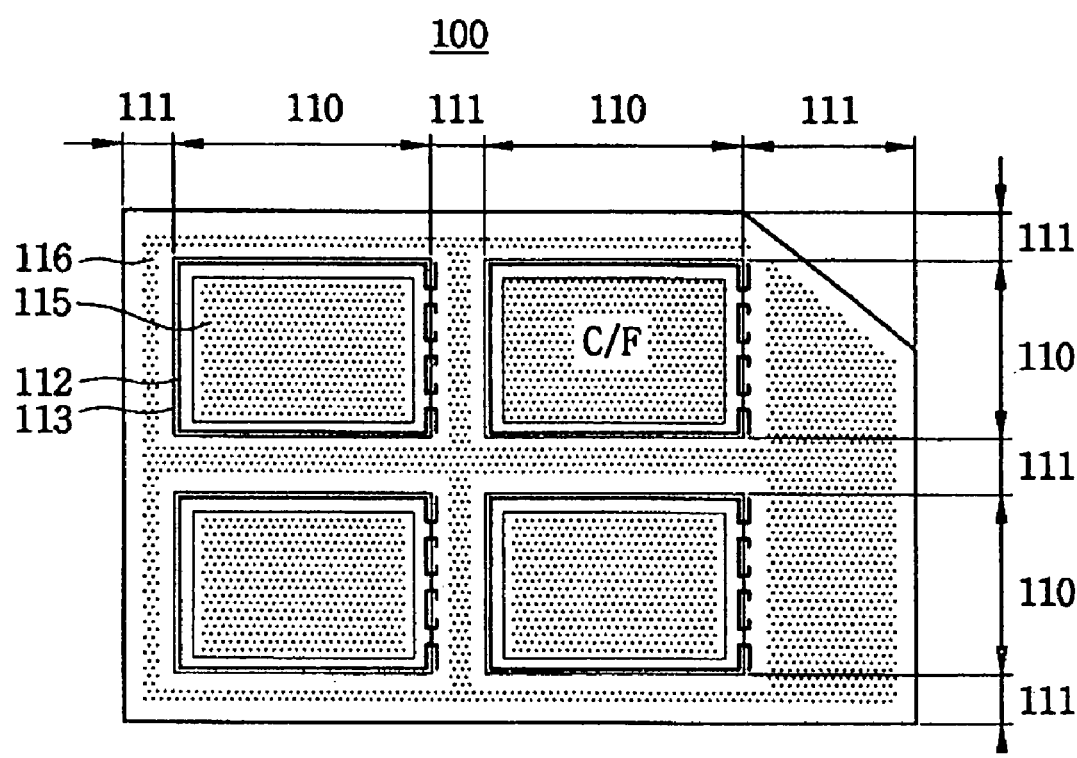
Figure 3C:
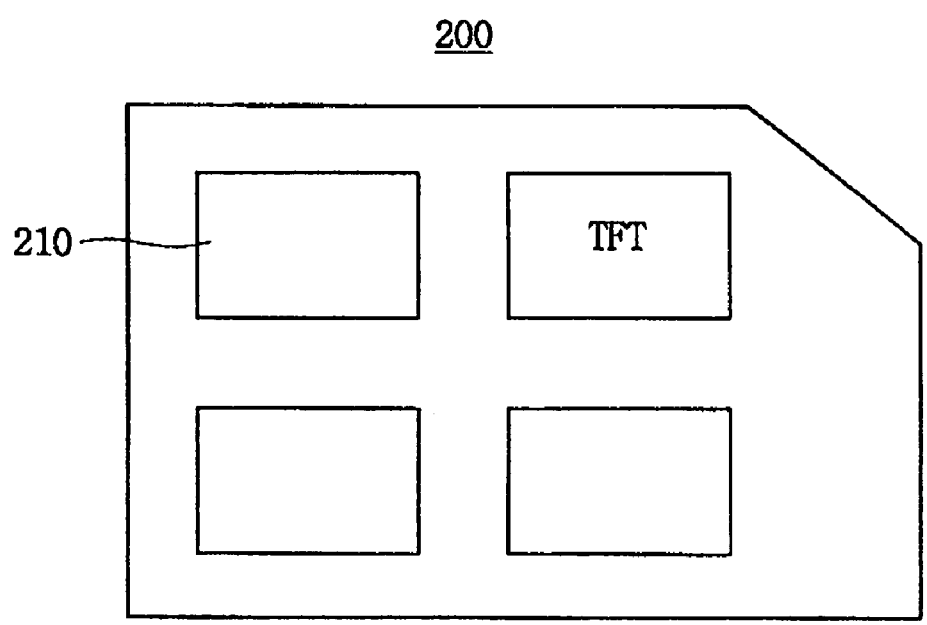
Figure 3D:
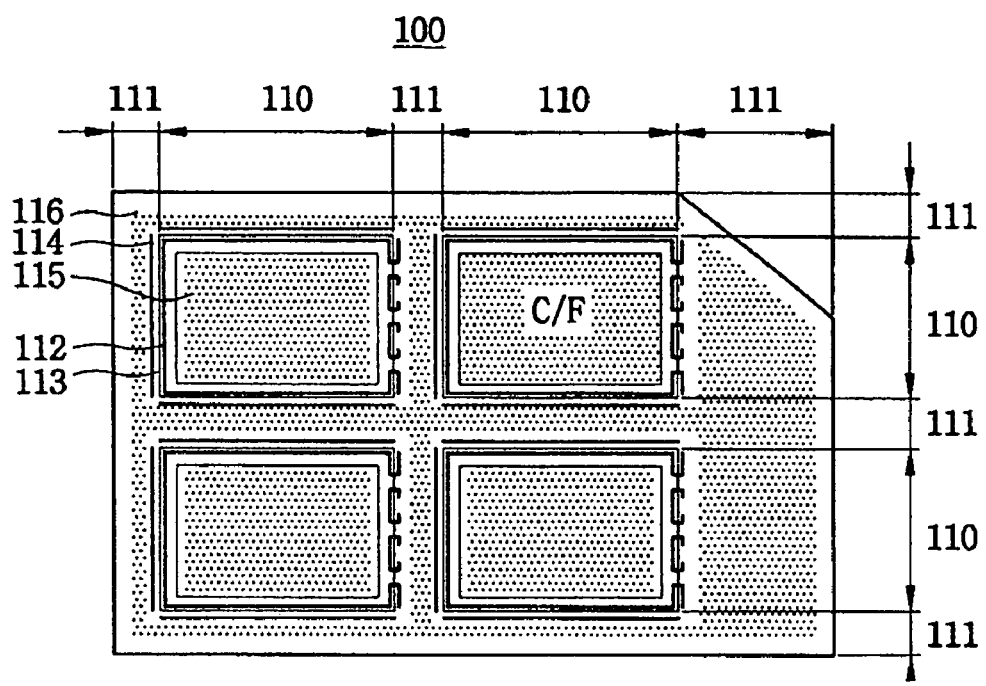
Figure 3D:
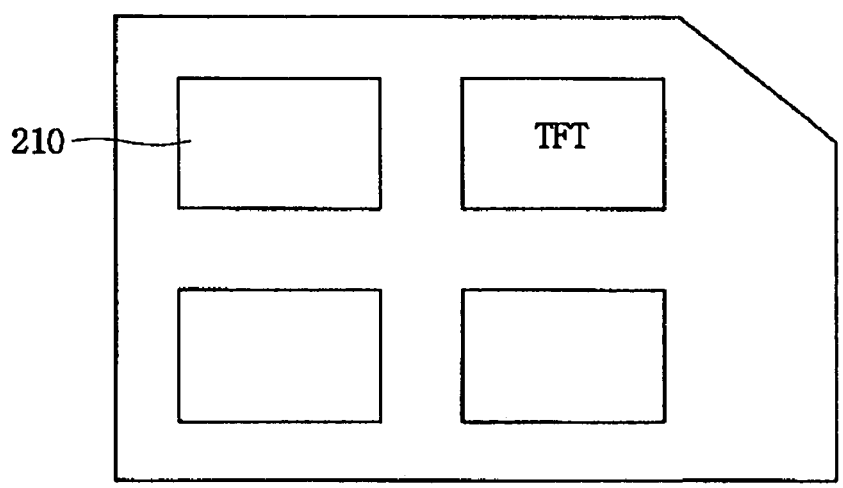
Figure 3E:
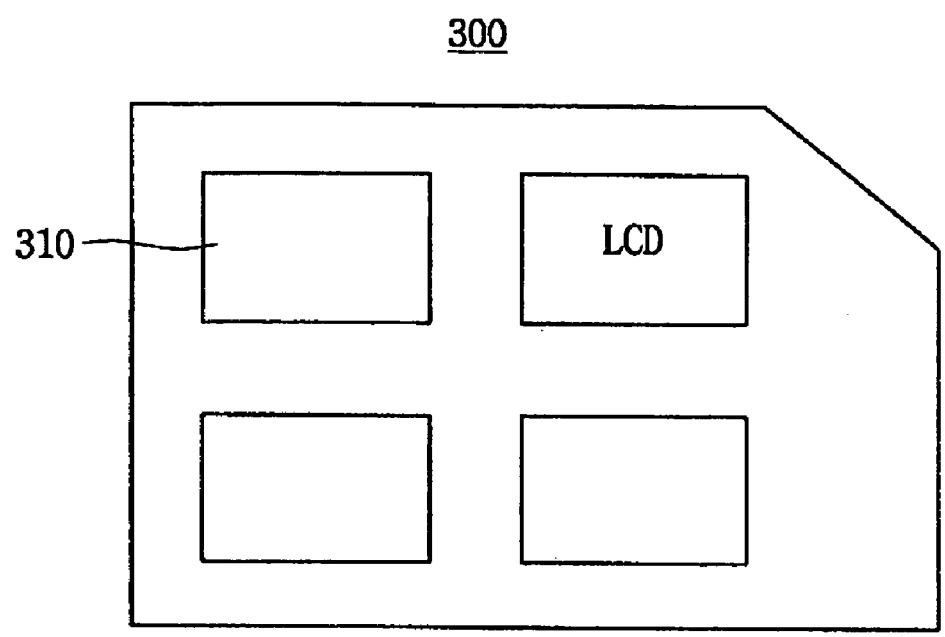

FIGS. 3A and 3E are plan views for illustrating a method of manufacturing a mother substrate for an LCD apparatus according to an embodiment of the present invention. The mother substrate 300, shown in FIG. 3E, includes the color filter mother substrate 100 and the TFT mother substrate 200.

Referring to FIG. 3A, the first sealant 112 is formed on the seal line portion of each substantial region 110 of the color filter mother substrate 100. The TFT mother substrate 200 may be cut along the cutting line 113 to form the TFT substantial regions 210, each including a plurality of TFT cells.

The TFTs are formed in a matrix configuration on the TFT substantial regions 210 of the TFT mother substrate 200 using deposition and etching processes. The pixel electrodes are formed on the display portions of the TFT mother substrate 200 in each TFT substantial region 210.

In order to form the first sealant 112 on the seal line portion of each substantial region 110, a sealing material is formed on the color filter mother substrate 100, and then the sealing material is exposed to ultraviolet (UV) light.

The first sealant 112 combines the TFT mother substrate 200 with the color filter mother substrate 100 such that the TFT mother substrate 200 is spaced apart from the color filter mother substrate 100 at a predetermined distance. The first sealant 112 includes a UV curable sealant or a thermally curable sealant. Preferably, the first sealant 112 includes the UV curable sealant. When the UV curable sealant is used as the first sealant 112, the TFT mother substrate 200 and the color filter mother substrate 100 may be combined with each other without a heat deformation. A liquid crystal layer is injected between the TFT mother substrate 200 and color filter mother substrate 100 using a vacuum injection. Each first sealant 112 includes an opening in the seal line portion of each substantial region 110 through which the liquid crystal may be injected.

Referring to FIG. 3B, the first spacers 115 are formed in the substantial region 110 of the color filter mother substrate 100. In order to form the first spacers 115, a photoresistive organic insulating layer is formed in each substantial region 110 of the color filter mother substrate 100. The photoresistive organic insulating layer includes a thermally curable resin such as acryl or the like, and a material such as a photoreaction initiator, a solvent, etc. The photoresistive organic insulating layer is exposed to UV light using a photomask having a pattern corresponding to the first spacers 115. The patterned organic insulating layer is then developed using a developing material such as tetramethylammonium hydroxide (TMAH) or the like. The first spacers 115 are hardened using a curing process.

A light-insensitive organic insulating layer may be used instead of the photoresistive organic insulating layer. When the light-insensitive organic insulating layer is used to form the first spacers 115, a photoresist layer is coated on the light-insensitive organic insulating layer. The photoresist material is then exposed and developed to form a photoresist pattern. The light-insensitive organic insulating layer is dry etched using the photoresist pattern as an etching mask to form the first spacers 115.

The black matrix is formed in each substantial region 110 and defines the R, G and B pixels and the display portion.

Referring to FIG. 3C, the second spacers 116 having a uniform size are formed in the dummy region 111. The second spacers 116 have a size substantially equal to that of the first spacers 115, and the distance between the second spacers 116 is substantially equal to that of the first spacers 115. The second spacers 116 may be formed by the same or similar processes and with the same or similar material used to form the first spacers 115.

The second spacers 116 are disposed in the dummy region 111, and a distance between the second spacers 116 is wider than a width of the second sealant 114. Preferably, each of the second spacers 116 includes a cubic shape having a side length (l) from about 50 μm to about 150 μm, and the distance between the second spacers 116 is from about 1.5 mm to about 2.5 mm. The second spacers 116 may have various shapes such as, for example, a cylindrical shape, and a polygonal prism shape.

When the second spacers 116 have the uniform size and distance as described above, the second sealant 114 may be disposed between the second spacers 116.

Therefore, when the location of the second sealant 114 is changed, the locations of the second spacers 116 remains the same and a new mask for the second spacers 116 may be omitted.

Referring to FIG. 3D, the second sealant 114 having a uniform size is formed in the dummy region 111 to assist in maintaining a uniform cell gap. The second sealant 114 may be referred to as the dummy sealant, is disposed between the second spacers 116 and is positioned substantially parallel with the first sealant 112. Liquid crystal may be dropped in each substantial region 110 to form a liquid crystal layer therein. The first sealant 112 may prevent leakage of the dropped liquid crystal.

Referring to FIGS. 3D and 3E, the TFT mother substrate 200 is disposed on the first and second sealants 112 and 114 formed in each substantial region 110 of the color filter substrate 100. The first and second sealants 112 and 114 are exposed to UV light to harden the first and second sealants 112 and 114. Therefore, the color filter mother substrate 100 may be combined with the TFT mother substrate 200 to form the mother substrate 300, resulting in one or a plurality of LCD panels.

The liquid crystal may also be injected between the color filter mother substrate 100 and the TFT mother substrate 200 using vacuum injection. In order to inject the liquid crystal layer between the color filter mother substrate 100 and the TFT mother substrate 200 using vacuum injection, the color filter mother substrate 100 is combined with the TFT mother substrate 200 by means of the first and second sealants 112 and 114. The liquid crystal is then injected between the color filter mother substrate 100 and the TFT mother substrate 200. The opening in the first sealant 112 of each substantial region 110 may be sealed so as to prevent the leakage of the liquid crystal layer through the opening.

Referring to FIG. 3E, a plurality of liquid crystal cells is formed in each liquid crystal substantial region 310 of the mother substrate 300, wherein each liquid crystal substantial region 310 represents an LCD panel of an LCD apparatus. The color filter mother substrate 100 and the TFT mother substrate 200 are cut along cutting lines 113 to form the LCD panels 310 of the mother substrate 300 for each LCD apparatus. The mother substrate 300 may include more or less LCD panels 310 depending on the desired scale of the LCD apparatus.

According to an embodiment of the present invention, the dummy sealant of an LCD apparatus may be formed between spacers having a uniform size and being spaced apart from each other at a uniform distance in the dummy region. Therefore, although the location of the dummy sealant may change, the spacers may be formed using the same mask because the locations of the spacers remain the same after the location of the dummy sealant is changed, thereby reducing cost and improving productivity of LCD apparatuses.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A liquid crystal display substrate, comprising:
   a first substrate including at least one substantial region;
   a dummy region adjacent the at least one substantial region;
   a plurality of first spacers and a first sealant positioned in the at least one substantial region; and
   a plurality of second spacers and a second sealant positioned in the dummy region, wherein each of the plurality of second spacers are spaced apart from one another at a uniform distance, and the second sealant is capable of being positioned in at least one open area created by spacing the second spacers apart from one another.

2. The liquid crystal display substrate as recited in claim 1, wherein the uniform distance is greater than a width of the second sealant.

3. The liquid crystal display substrate as recited in claim 1, wherein the uniform distance ranges from about 1.5 mm to about 2.5 mm.

4. The liquid crystal display substrate as recited in claim 1, wherein each of the plurality of second spacers has a uniform size.

5. The liquid crystal display substrate as recited in claim 4, wherein each of the plurality of second spacers includes a cubic shape with a side length in the range of about 50 μm to about 150 μm.

6. The liquid crystal display substrate as recited in claim 1, wherein each of the plurality of second spacers includes one of a cubic shape, a cylindrical shape and a prism shape.

7. The liquid crystal display substrate as recited in claim 1, wherein the second sealant is positioned substantially parallel to the first sealant.

8. The liquid crystal display substrate as recited in claim 1, further comprising a second substrate positioned opposite the first substrate.

9. The liquid crystal display substrate as recited in claim 8, further comprising a liquid crystal layer between the first substrate and the second substrate.

10. The liquid crystal display substrate as recited in claim 8, wherein the first sealant and the second sealant are positioned between the first substrate and the second substrate to bind the first substrate and the second substrate and create a gap therebetween.

11. The liquid crystal display substrate as recited in claim 8, wherein the first substrate is a color filter substrate and the second substrate is a thin-film transistor substrate.

12. The liquid crystal display substrate as recited in claim 1, wherein the first sealant is positioned on a seal line portion of the at least one substantial region.

13. The liquid crystal display substrate as recited in claim 1, further comprising a cutting line positioned between the at least one substantial region and the dummy region, wherein the cutting line defines the at least one substantial region.

14. The liquid crystal display substrate as recited in claim 1, wherein the first sealant and the second sealant include one of an ultraviolet curable sealant and a thermally curable sealant.

15. The liquid crystal display substrate as recited in claim 1, wherein the plurality of first spacers and the plurality of second spacers are formed from one of a photoresistive insulating layer and a light-insensitive insulating layer.

16. The liquid crystal display substrate as recited in claim 1, wherein the second sealant is capable of being positioned in at least one other open area created by spacing the second spacers apart from one another at the uniform distance.

17. A liquid crystal display substrate, comprising:
a first substrate including at least one substantial region;
a dummy region adjacent the at least one substantial region;
a plurality of first spacers and a first sealant positioned in the at least one substantial region;
a plurality of second spacers and a second sealant positioned in the dummy region, wherein each of the plurality of second spacers are spaced apart from one another at a uniform distance, and the second sealant is capable of being positioned in at least one open area created by spacing the second spacers apart from one another; and
a second substrate positioned opposite the first substrate including at least one corresponding substantial region.

18. The liquid crystal display substrate as recited in claim 17, wherein the first sealant and the second sealant are positioned between the first substrate and the second substrate to bind the first substrate and the second substrate and create a gap therebetween.

19. The liquid crystal display substrate as recited in claim 18, wherein the gap includes liquid crystal.

20. The liquid crystal display substrate as recited in claim 17, wherein the at least one substantial region of the first substrate and the at least one corresponding substantial region of the second substrate are combined to define an area including a liquid crystal display panel.

21. The liquid crystal display substrate as recited in claim 17, wherein a plurality of color filters are formed on the at least one substantial region of the first substrate.

22. The liquid crystal display substrate as recited in claim 17, wherein a plurality of thin-film transistors are formed on the at least one corresponding substantial region of the second substrate.

23. The liquid crystal display substrate as recited in claim 17, wherein the uniform distance is greater than a width of the second sealant.

24. The liquid crystal display substrate as recited in claim 17, wherein each of the plurality of second spacers has a uniform size.

25. The liquid crystal display substrate as recited in claim 17, wherein the second sealant is positioned substantially parallel to the first sealant.

26. A method for forming a liquid crystal display substrate, comprising:
forming a plurality of first spacers and a first sealant in at least one substantial region on a first substrate;
forming a plurality of second spacers and a second sealant in a dummy region on the first substrate adjacent the at least one substantial region, wherein each of the plurality of second spacers are spaced apart from one another at a uniform distance; and
positioning the second sealant in at least one open area created by spacing the second spacers apart from one another.

27. The method as recited in claim 26, wherein the uniform distance is greater than a width of the second sealant.

28. The method as recited in claim 26, wherein the uniform distance ranges from about 1.5 mm to about 2.5 mm.

29. The liquid crystal display substrate as recited in claim 26, wherein each of the plurality of second spacers has a uniform size.

30. The method as recited in claim 29, wherein each of the plurality of second spacers includes a cubic shape with a side length in the range of about 50 $\mu$m to about 150 $\mu$m.

31. The method as recited in claim 26, wherein each of the plurality of second spacers includes one of a cubic shape, a cylindrical shape and a prism shape.

32. The method as recited in claim 26, further comprising positioning the second sealant substantially parallel to the first sealant.

33. The method as recited in claim 26, further comprising dropping liquid crystal in the at least one substantial region.

34. The method as recited in claim 26, further comprising positioning a second substrate opposite the first substrate.

35. The method as recited in claim 34, further comprising injecting liquid crystal between the first substrate and the second substrate.

36. The method as recited in claim 35, wherein the liquid crystal is injected through a hole formed in the first sealant.

37. The method as recited in claim 34, further comprising positioning the first sealant and the second sealant between the first substrate and the second substrate to bind the first substrate and the second substrate and create a gap therebetween.

38. The method as recited in claim 34, further comprising:
forming a plurality of color filters on the first substrate; and
forming a plurality of thin-film transistors on the second substrate.

39. The method as recited in claim 26, further comprising positioning the first sealant on a seal line portion of the at least one substantial region.

40. The method as recited in claim 26, further comprising forming a cutting line between the at least one substantial region and the dummy region, wherein the cutting line defines the at least one substantial region.

41. The method as recited in claim 26, wherein the first sealant and the second sealant include one of an ultraviolet curable sealant and a thermally curable sealant.

42. The method as recited in claim 26, wherein the plurality of first spacers and the plurality of second spacers are formed from one of a photoresistive insulating layer and a light-insensitive insulating layer.

43. The method as recited in claim 26, further comprising positioning the second sealant in at least one other open area created by spacing the second spacers apart from one another at the uniform distance.

44. The method as recited in claim 26, further comprising curing the first sealant and the second sealant by exposing the first sealant and the second sealant to one of heat and ultraviolet light.

45. The method as recited in claim 26, wherein forming the plurality of first spacers includes:
forming a photoresistive insulating layer in the at least one substantial region;

exposing the photoresistive insulating layer to ultraviolet light using a photomask having a pattern corresponding to the plurality of first spacers to form a patterned insulating layer;

developing the patterned insulating layer to form the plurality of first spacers.

46. The method as recited in claim 26, wherein forming the plurality of first spacers includes:

forming a light-insensitive insulating layer in the at least one substantial region;

coating the light-insensitive insulating layer with a photoresist layer;

forming a photoresist pattern; and etching the light-insensitive insulating layer using the photoresist pattern as an etching mask to form the plurality of first spacers.

* * * * *